(12) United States Patent
Bazan et al.

(10) Patent No.: US 7,754,839 B2
(45) Date of Patent: *Jul. 13, 2010

(54) QUASI-LIVING METAL CATALYST FOR ETHYLENE HOMO-POLYMERIZATION AND CO-POLYMERIZATION WITH 5-NORBORNEN -2-YL ACETATE

(75) Inventors: Guillermo C. Bazan, Santa Barbara, CA (US); Prasenjit Ghosh, Goleta, CA (US); Fumihiko Shimizu, Hachioji (JP)

(73) Assignee: The Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/378,957

(22) Filed: Mar. 3, 2003

(65) Prior Publication Data

US 2004/0024149 A1 Feb. 5, 2004

(51) Int. Cl.
*C08F 4/80* (2006.01)
*C08F 220/10* (2006.01)
*C08F 297/08* (2006.01)
(52) U.S. Cl. .................. 526/329; 526/171; 526/281; 526/308; 525/245; 525/299; 525/302
(58) Field of Classification Search ............... 526/113, 526/117, 281, 118, 171, 308, 329; 525/245, 525/299, 302
See application file for complete search history.

(56) References Cited

U.S. PATENT DOCUMENTS

| 5,763,548 | A | * | 6/1998 | Matyjaszewski et al. | 526/135 |
| 5,919,867 | A | * | 7/1999 | Yasuda et al. | 525/299 |
| 6,174,976 | B1 | | 1/2001 | Killian et al. | |
| 2004/0171479 | A1 | * | 9/2004 | Bazan et al. | 502/102 |
| 2005/0059779 | A1 | * | 3/2005 | Chang et al. | 525/88 |

FOREIGN PATENT DOCUMENTS

| WO | WO98/42664 | * | 10/1998 |
| WO | WO 9842664 | | 10/1998 |
| WO | WO 9842665 | | 10/1998 |
| WO | WO 01/92348 A2 | | 12/2001 |

OTHER PUBLICATIONS

International Search Report, dated Sep. 7, 2004; PCT/US2004/006301.
Written Opinion of the International Searching Authority; PCT/US2004/006301.

"Ethylene Homopolymerization and Copolymerization with Functionalized 5-Norbornen-2-yl Monomers by a Novel Nickel Catalyst System"; by S.J. Diamanti, P. Ghosh, F. Shimizu and G. Bazan; Macromolecules 2003, 36, 9731-9735.
"α-Iminocarboxamidato—Nickel (II) Ethylene Polymerization Catalyst"; by. B.Y. Lee, G.C. Bazan, J. Vela, Z.J.Komon and X. Bu; J. American Chem. Soc. 2001, vol. 123, pp. 5352-5353.
"Boron Trifluoride Activation of Ethylene Oligomerization and Polymerization Catalysts"; By Z.J.A. Komon; G.C. Bazan, C. Fang and X. Bu; Inorganica Chimica Acta, vol. 345, (2003) pp. 95-102.
"Controlled Polymerization of β-Lactamus Using Metal-Amido Complexes: Synthesis of Block Copoly (β-peptides)"; By J. Cheng and T.J. Deming; J. American Chem. Soc. 2001, vol. 123, pp. 9457-9458.
Ittel, S.D. et al., "Late-Metal Catalysts for Ethyleen Homo- and Copolymerization," *Chem. Rev.* 100(4):1169-1203 (2000).
Gates, D.P. et al., "Synthesis of Branched Polyethylene Using (α-Diimine) nickel(II) Catalysts: Influence of Temperature, Ethylene Pressure, and Ligand Structure on Polymer Properties," *Macromolecules* 33:2320-2334 (2000).
Svejda, S.A. et al., "Low-Temperature Spectroscopic Observation of Chain Growth and Migratory Insertion Barriers in (α-Diimine)Ni(II) Olefin Polymerization Catalysts," *J. am. Chem. Soc.* 121:10634-10635 (1999).
Younkin, T.R. et al., "Neutral, Single-Component Nickel (II) Polyolefin Catalysts That Tolerate Heteroatoms," *SCIENCE* 287:460-462 (2000).
Lee, B.Y. et al., "α-Iminocarboxamidato-Nickel(II) Ethylene Polymerization Catalysts," *J. Am. Chem. Soc.* 123:5352-5353 (2001).
Coates, G.W. et al., "Catalysts for the Living Insertion Polymerization of Alkenes: Access to New Polyolefin Architectures Using Ziegler-Natta Chemistry." *Angew. Chem. Int. Ed.* 41:2236-2257 (2002).
Jansen, J.C. et al., "Evidence of the Quasi-Living Character of the *ansa*-Zirconocene/MAO-Catalyzed Copolymerization of Ethylene and Norbomene," *Macromol. Rapid Commun.* 22(17):1394-1398 (2001).
Schunn, R.A. et al., "BIS(1,5-Cyclooctadiene)Nickel(0)," *Inorg. Synth.* 28:94-98 (1990).
Eric F. Connor et al., "*Linear Functionalized Polyethylene Prepared with Highly Active Neutral Ni(II) Complexes*" Journal of Polymer Sciences, Part A, Polymer Chemistry, 2002, vol. 40, No. 16, pp. 2842-2854.

* cited by examiner

*Primary Examiner*—Roberto Rábago
(74) *Attorney, Agent, or Firm*—Berliner & Associates

(57) ABSTRACT

Methods and compositions for the generation of quasi-living catalysts for homo-polymerization of olefins such as ethylene, α-olefins and functionalized olefins and for the co-polymerization of olefins with functionalized monomers is disclosed. A process for producing these homo- and co-polymers is also disclosed. A polymeric material with enhanced hydrophilic properties, generated by the co-polymerization of ethylene with 5-norbornen-2-yl acetate, is also disclosed.

5 Claims, 3 Drawing Sheets

QUASI-LIVING METAL CATALYST FOR ETHYLENE HOMO-POLYMERIZATION AND CO-POLYMERIZATION WITH 5-NORBORNEN -2-YL ACETATE

BACKGROUND OF THE INVENTION

Description of the Related Art

Catalysts for olefin co-polymerization with functional monomers are rare compared to their olefin polymerization counterparts (See reference 1). PCT patent application WO01/92348 describes the co-polymerization of ethylene using zwitterionic nickel complexes requiring Lewis acids. Lewis Acids are deactivated by functionalities and they promote unwanted secondary reactions, e.g., chain transfer, which are detrimental to the polymer chain growth. Other types of neutral catalysts, capable of homo-and co-polymerizing olefins, have been reported by Younkin et al. (See reference 2). The catalysts are neutral species that do not require an activator, however, they are prone to an induction period and have lower activity compared to cationic systems which perform in the presence of methylaluminoxanes and Lewis acids.

Furthermore, co-polymerization catalysts displaying characteristics of living polymerizations, are even rarer (See reference 3). The ideal catalyst-system would produce a living or quasi-living polymer. There are seven accepted criteria for living polymerizations with living catalyst systems. These are: 1) The polymerization proceeds to a complete monomer conversion and restarts upon further addition of the monomer; 2) Linear dependence of Mn with time; 3) The number of active sites remains constant during polymerization; 4) The molecular weight can be precisely controlled by stoichiometry; 5) A narrow PDI; 6) Sequential monomer addition results in a block co-polymer; and 7) An end-functionalized co-polymer can be synthesized. Systems that partially fulfill this list of criteria are termed "quasi-living". Jansen et. al., reported quasi-living catalysts for ethylene and norbornene co-polymerization (See reference 4). However, no functionalized norbornene derivatives were co-polymerized.

SUMMARY OF THE INVENTION

The present invention provides a method of using a novel quasi-living metal catalyst for homo-polymerization of olefins such as ethylene, α-olefins and functionalized olefins and for co-polymerization of olefins with functionalities such as acetates (e.g., 5-norbornen-2-yl acetate). Specifically, the catalyst comprises a combination of two neutral metal complexes, e.g., L($^i$Pr$_2$)Ni(CH$_2$Ph)(PMe$_3$) [L=N-(2,6-diisopropylphenyl)-2-(2,6-diisopropylphenylimino)propanamide] (See reference 5) and Ni(COD)$_2$ (COD=cyclooctadiene) that produces high molecular weight polymers, found experimentally to be about ($M_n$) $2.20 \times 10^4$ to about $1.10 \times 10^5$ for ethylene homo-polymers and about ($M_n$) $3.90 \times 10^4$ to about $1.10 \times 10^5$ for acetate-functionalized co-polymers with narrow molecular weight distributions, in the range of about 1.3-1.6 for ethylene homo-polymers and about 1.2-1.6 for acetate-functionalized co-polymers, respectively.

In one embodiment, the present invention discloses a process comprising combining an amount of a first olefin monomer with an initiator metal compound so that a polymer chain is generated. The initiator metal compound comprises a Group VIII transition metal complex, the complex comprising a combination of any two neutral metal complexes of the general formulas (I-IV)

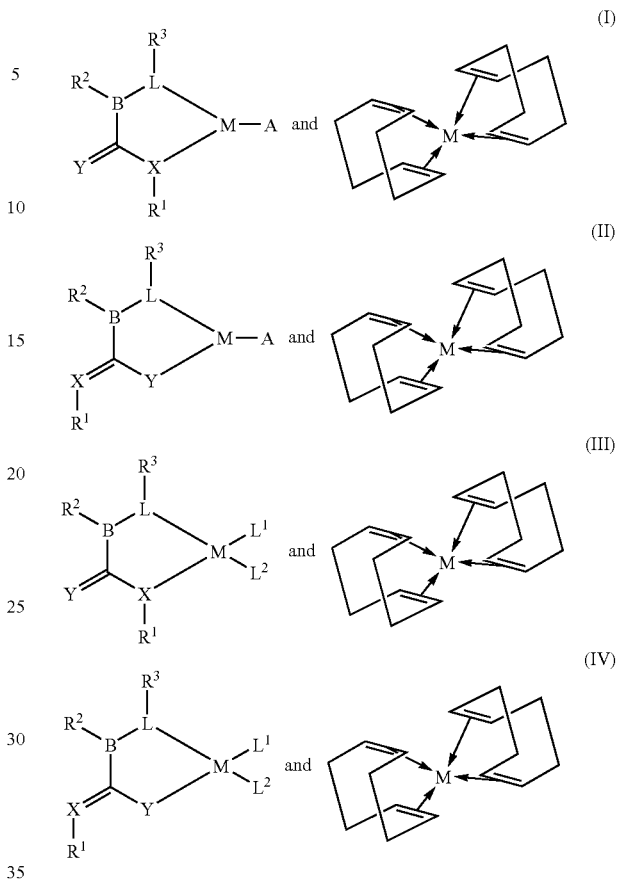

wherein:

M is a Group VIII transition metal such as Ni, Pt, or Pd;

A is a three electron donor such as π-allyl, substituted π-allyl, π-benzyl, or substituted π-benzyl;

X is N or P;

Y is O, CH$_2$, or S;

L is N or P or a structure that is capable of forming a neutral two electron donor ligand;

L$^2$ is a neutral monodentate ligand;

L$^1$ is a neutral monodentate ligand which may be displaced by the olefin, and L$^2$ is an monoanionic monodentate ligand, or L$^1$ and L$^2$ taken together are a monoanionic bidentate ligand, provided that the monoanionic monodentate ligand or the monoanionic bidentate ligand may add to the olefin;

B is an atom or group of atoms connecting covalently the carbonyl group and L;

R$^1$ each independently is hydrogen, hydrocarbyl, substituted hydrocarbyl bearing functional group, or other hydrocarbyl group;

R$^2$ each independently is hydrogen, hydrocarbyl, substituted hydrocarbyl bearing functional group, or other hydrocarbyl group; and R$^3$ each independently is hydrogen, hydrocarbyl, substituted hydrocarbyl bearing functional group, or other hydrocarbyl group; and combining an amount of a second olefin monomer with the polymer chain so that the second olefin monomer is added to the polymer chain. The process of the present invention includes continuous olefin monomer feeds to the metal compound.

In another embodiment of the present invention, the amount of the first and/or second olefin monomers is depleted, after the polymer chain is generated.

In yet another embodiment of the invention the transition metal of the metal catalyst is nickel.

In a further embodiment of the invention, the first and second olefin monomers are the same or different and are 5-norbornen-2-yl acetate or ethylene.

In a further embodiment of the present invention, $R^1=R^3=$ (2,6-diisopropylphenyl); $R^2$=methyl; X=L=Nitrogen; Y=Oxygen; B=carbon; $L^1=CH_2Ph$; and $L^2=PMe_3$.

In another embodiment, the present invention discloses a process for the quasi-living homo-polymerization and quasi-living co-polymerization of an olefin wherein the olefin is selected from one or more of $R^4CH=CH_2$, cyclopentene, a styrene, a norbornene, or a polar olefin of the general formula $H_2C=CR^5(CH_2)_sCO_2R^6$, substituted cyclopentene, substituted styrene, norbornene derivative bearing functional group or other hydrocarbyl group, in the presence of a catalyst derived from a combination of two neutral transition metal complexes, at a temperature of about −100° C. to about 200° C. $R^4$, $R^5$ and $R^6$ are each independently hydrogen, hydrocarbyl group, substituted hydrocarbyl bearing functional group, or other hydrocarbyl group and s is an integer from 0 to 100.

In yet a further embodiment of the invention, products prepared by the above-described processes are disclosed. These polymer products are characterized by having a narrow molecular weight distribution of about 1.2-1.6.

In still a further embodiment of the present invention, a polymer product prepared by the above-described processes is a block co-polymer, a star-shaped polymer, a graft polymer or an alternating polymer.

In still yet a further embodiment of the present invention, a polymer is made by the quasi-living co-polymerization of ethylene with 5-norbornen-2-yl acetate. The polymer has enhanced hydrophilic properties.

The quasi-living characteristics of the catalyst facilitates the generation of a novel polymeric product, such as functionalized block co-polymers that are of substantial industrial interest. The present invention displays quasi-living characteristics for ethylene homo-polymerization and also for co-polymerization with a functionalized polar monomer, thereby underscoring the versatility of the catalyst.

DETAILED DESCRIPTION OF THE INVENTION

The following examples were performed under an inert atmosphere using standard glove box and Schlenk techniques. Solvents like toluene, tetrahydrofuran (THF), hexane and pentane were distilled from benzophenone ketyl as required. All polymerization reactions were carried out in a glass reactor as described previously (see Reference 5). Toluene for polymerization runs was distilled from sodium/potassium alloy. Nickel was chosen as the transition metal for the metal complex. $L(^iPr_2)Ni(CH_2Ph)(PMe_3)$ [L=N-(2,6-diisopropylphenyl)-2-(2,6-diisopropylphenylimino)propanamide](see Reference 5) and $Ni(COD)_2$ (see Reference 6) were synthesized as reported and purified by re-crystallization prior to polymerization use. NMR spectra were obtained using Varian Unity 400 or 500 spectrometers. $^1H$ NMR spectra of the polymers were obtained in mixed solvent ($C_6D_6/1$, 2,4-trichlorobenzene 1:4 ratio in volume) at about 115° C. GPC analyses were done at Mitsubishi Chemical Corporation., Japan, in o-dichlorobenzene at about 135° C.

The quasi-living nature of the nickel catalyst, $L(^iPr_2)Ni(CH_2Ph)(PMe_3)$ and $Ni(COD)_2$, for ethylene homo-polymerization was established based on the following criteria that are characteristic of living polymerization.

EXAMPLE 1

Molecular Weight Information

Time dependence studies of ethylene homo-polymerization were carried out. A toluene solution containing $[L(^iPr_2)Ni(CH_2Ph)(PMe_3)]$ (about 0.34 mM) and $Ni(COD)_2$ (about 0.85 mM) was pressurized with about 100 psi of ethylene and stirred at about 20° C. The reactor was depressurized after varied amounts of time and the reaction mixture was quenched immediately with acetone. The polyethylene polymers were then isolated by filtratration and were then dried in vacuum.

Figure 1:
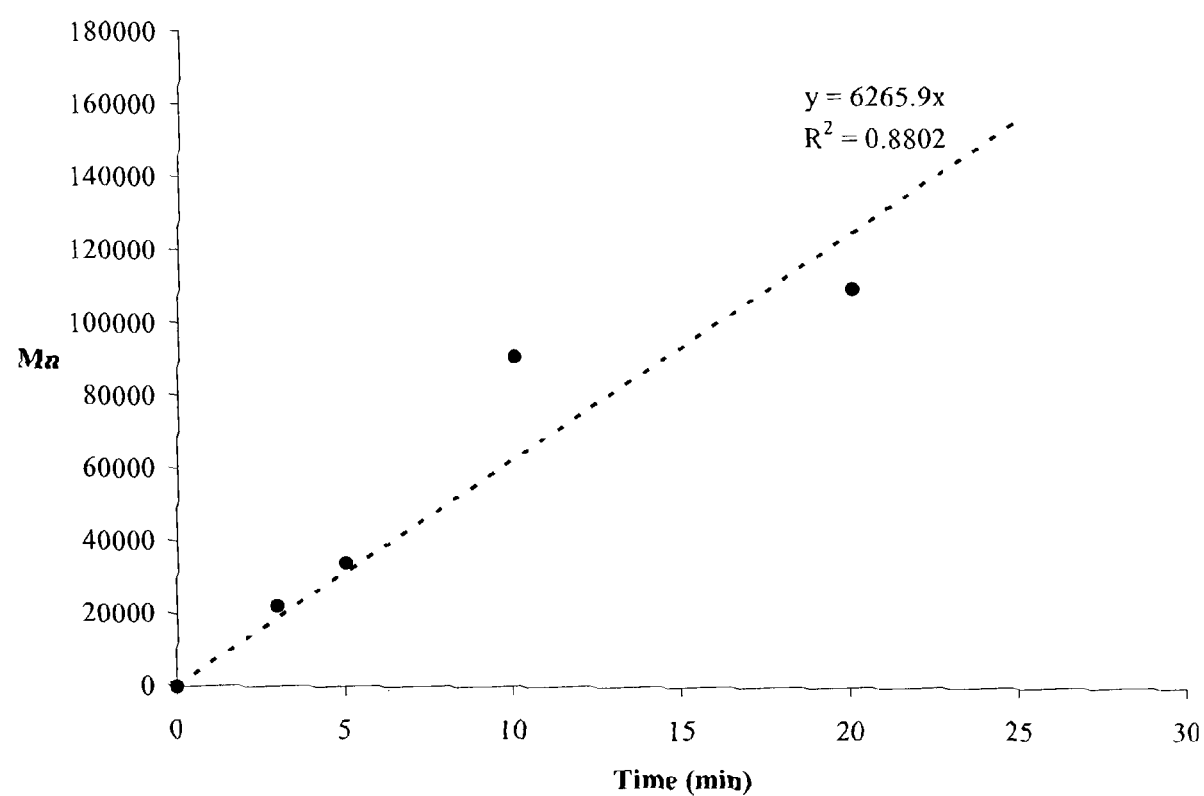
FIG. 1 is a graphical representation of an embodiment of the present invention showing the number average molecular weight ($M_n$) versus time of the samples in Table 1 and described in Examples 2, 3, 4 and 5.

As typical of living polymerizations, a linear increase of the number average molecular weight ($M_n$) with time was observed, as shown in Table 1 and FIG. 1.

TABLE 1

| Time (min) | $M_w$ | $M_n$ | $M_w/M_n$ |
| --- | --- | --- | --- |
| 3 | $3.67 \times 10^4$ | $2.20 \times 10^4$ | 1.6 |
| 5 | $4.52 \times 10^4$ | $3.40 \times 10^4$ | 1.3 |
| 10 | $1.25 \times 10^5$ | $9.10 \times 10^4$ | 1.4 |
| 20 | $1.49 \times 10^5$ | $1.10 \times 10^5$ | 1.3 |

Table 1 shows the weight average molecular weight ($M_w$) and the number average molecular weight ($M_w$) as a function of time for ethylene homo-polymerization. $L(^iPr_2)Ni(CH_2Ph)(PMe_3)$ (about 0.34 mM); $Ni(COD)_2$ (about 0.85 mM); about 100 psi ethylene pressure and about 20° C. temperature. Consistent with being a quasi-living polymerization system, narrow molecular weight distributions, $M_w/M_n$, in the range of about 1.3-1.6 were observed in all cases (see Table 1).

A living system has a number of active sites which equals the number of polymer chains. An estimate of the molecular weight of the polymer chains was obtained according to the calculations shown in Table 2 below.

For example, the $4^{th}$ sample entry of Table 2 shows the total amount of ethylene consumed was about 1222 standard cubic cm (sec) which equals about 1.527 g (0.055 moles) of ethylene (1 sec=$1.25 \times 10^{-3}$ g of ethylene at STP. STP is standard temperature and pressure, i.e., 0 C. and 760 mm of mercury (1.01 kPa). The $L(^iPr_2)Ni(CH_2Ph)(PMe_3)$ loading was about $10 \times 10^{-6}$ moles. Therefore, considering a process whereby the rate of initiation is on the order of propagation, the number of ethylene units in a polymer chain per active-site corresponds to about 5500 (0.055 moles of ethylene/$10 \times 10^{-6}$ moles of Ni catalyst). The molecular weight of the polymer under these conditions corresponds to about $1.54 \times 10^5$ {5500×$MW_{ethylene}$ (28 g/mole)}. For comparison, the experimental values were about $1.49 \times 10^5$ ($M_w$) and $1.10 \times 10^5$ ($M_n$). Similar estimates were made for other experiments shown by the $1^{st}$, $2^{nd}$, and $3^{rd}$ sample entries in Table 2.

Table 2 shows that the calculated molecular weights are in agreement with the experimental molecular weight values for the samples shown in Table 1 and described in Examples 2, 3, 4 and 5. Thus, the number of the active-sites corresponded to the number of initiator molecules used.

TABLE 2

| $C_2H_4$ Mass flow (sccm) | Uptake Estimated Value (g) | Polymer Isolated (g) | Time (min) | MW Calc. ($10^4$) | $M_w$ Exp. ($10^4$) | $M_n$ Exp. ($10^4$) |
|---|---|---|---|---|---|---|
| 133 | 0.166 | 0.140 | 3 | 1.66 | 3.67 | 2.20 |
| 264 | 0.329 | 0.173 | 5 | 3.30 | 4.52 | 3.40 |
| 986 | 1.232 | 1.096 | 10 | 12.3 | 12.5 | 9.10 |
| 1222 | 1.527 | 1.322 | 20 | 15.4 | 14.9 | 11.0 |

The data in FIG. 1 and Tables 1-2 establish the quasi-living nature of the nickel catalyst with regards to ethylene homopolymerization.

EXAMPLE 2

A glass reactor was loaded inside a glove box with L($^i$Pr$_2$)Ni(CH$_2$Ph)(PMe$_3$) (about 10 µmol; 1.00 g of 8.77 mM solution in toluene) and Ni(COD)$_2$ (about 25 µmol; 1.25 g of 17.6 mM solution in toluene) and toluene (about 23.7 g), such that the final volume of the toluene solution was about 30 mL. The glass reactor was sealed inside the glove box and was attached to a vacuum/nitrogen line manifold. Ethylene was fed continuously into the reactor at about 100 psi and the pressurized reaction mixture was stirred at about 20° C. Ethylene was vented after about 3 minutes and acetone was added to quench the polymerization. The precipitated polymer was collected by filtration and dried under high vacuum overnight. The reaction produced about 0.140 g of polyethylene polymer. The activity of the catalyst was about 499 kg mol$^{-1}$ h$^{-1}$.

Polymer Characterization: GPC Analysis (o-dichlorobenzene, 135° C.): $M_w$=about $3.67 \times 10^4$, $M_w/M_n$=about 1.6. DSC Analysis: $T_m$=about 126.4° C. $^1$H NMR (C$_6$D$_6$/1,2,4-trichlorobenzene, about 115° C.): 10.2 methyl branches per 1000 methylene carbons.

EXAMPLE 3

A glass reactor was loaded inside a glove box with L($^i$Pr$_2$)Ni(CH$_2$Ph)(PMe$_3$) (about 10 µmol; 1.00 g of 8.77 mM solution in toluene) and Ni(COD)$_2$ (about 25 µmol; 1.25 g of 17.6 mM solution in toluene and toluene (about 23.7 g) such that the final volume of the toluene solution was about 30 mL. The glass reactor was sealed inside the glove box and was attached to a vacuum/nitrogen line manifold. Ethylene was fed continuously into the reactor at about 100 psi and the pressurized reaction mixture was stirred at about 20° C. Ethylene was vented after about 5 minutes and acetone was added to quench the polymerization. The precipitated polymer was collected by filtration and dried under high vacuum overnight. The reaction produced about 0.173 g of polyethylene polymer. The activity of the catalyst was about 495 kg mol$^{-1}$ h$^{-1}$.

Polymer Characterization: GPC Analysis (o-dichlorobenzene, about 135° C.): $M_w$=about $4.52 \times 10^4$, $M_w/M_n$=about 1.3. DSC Analysis: $T_m$=about 127.9° C. $^1$H NMR (C$_6$D$_6$/1,2,4-trichlorobenzene, about 115° C.): 12.1 methyl branches per 1000 methylene carbons.

EXAMPLE 4

A glass reactor was loaded inside a glove box with L($^i$Pr$_2$)Ni(CH$_2$Ph)(PMe$_3$) (about 10 µmol; 1.00 g of 8.77 mM solution in toluene) and Ni(COD)$_2$ (about 25 µmol; 1.25 g of 17.6 mM solution in toluene) and toluene (about 23.7 g), such that the final volume of the toluene solution was about 30 mL. The glass reactor was sealed inside the glove box and was attached to a vacuum/nitrogen line manifold. Ethylene was fed continuously into the reactor at about 100 psi and the pressurized reaction mixture was stirred at about 20° C. Ethylene was vented after about 10 minutes and acetone was added to quench the polymerization. The precipitated polymer was collected by filtration and dried under high vacuum overnight. The reaction produced about 1.10 g of polyethylene polymer. The activity of the catalyst was about 821 kg mol$^{-1}$ h$^{-1}$.

Figure 2:
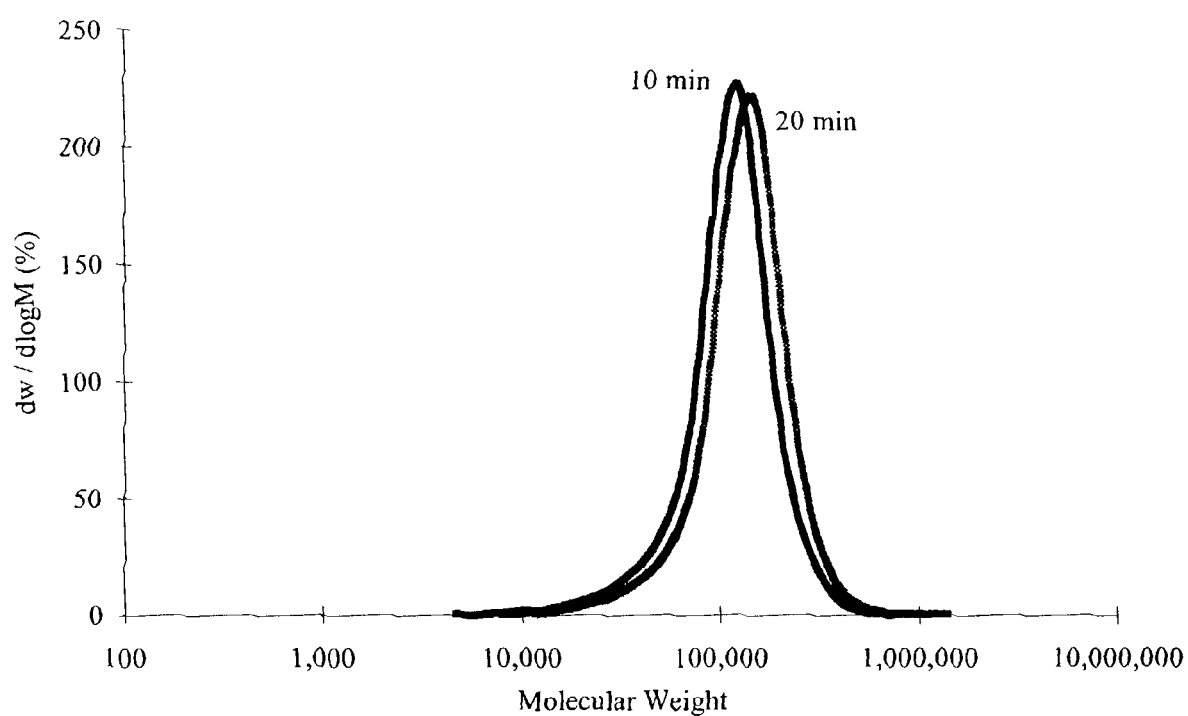
FIG. 2 is a Gel Permeation Chromatography (GPC) trace of the polyethylene obtained in Examples 4 and 5.

Polymer Characterization: GPC Analysis (o-dichlorobenzene, about 135° C.): $M_w$=about $1.25 \times 10^5$, $M_w/M_n$=about 1.4. DSC Analysis: $T_m$=about 123.6° C. $^1$H NMR (C$_6$D$_6$/1,2,4-trichlorobenzene, 115° C.): 14.2 methyl branches per 1000 methylene carbons. The GPC trace of the polyethylene obtained shows a unimodal molecular weight distribution is shown in FIG. 2.

EXAMPLE 5

A glass reactor was loaded inside a glove box with L($^i$Pr$_2$)Ni(CH$_2$Ph)(PMe$_3$) (about 10 µmol; 1.00 g of 8.77 mM solution in toluene) and Ni(COD)$_2$ (about 25 µmol, 1.25 g of 17.6 mM solution in toluene) and toluene (about 23.7 g) such that the final volume of the toluene solution was about 30 mL. The glass reactor was sealed inside the glove box and was attached to a vacuum/nitrogen line manifold. Ethylene was fed continuously into the reactor at about 100 psi and the pressurized reaction mixture was stirred at about 20° C. Ethylene was vented after about 20 minutes and acetone was added to quench to polymerization. The precipitated polymer was collected by filtration and dried under high vacuum overnight. The reaction produced about 1.322 g of polyethylene polymer. The activity of the catalyst was about 482 kg mol$^{-1}$ h$^{-1}$.

Polymer Characterization: GPC Analysis (o-dichlorobenzene, about 135° C.): MW=about $1.49 \times 10^5$, $M_w/M_n$=about 1.3. DSC Analysis: $T_m$=about 125.6° C. $^1$H NMR (C$_6$D$_6$/1,2,4-trichlorobenzene, about 115° C.): 7.8 methyl branches per 1000 methylene carbons. The GPC trace of the polyethylene obtained shows a unimodal molecular weight distribution is shown in FIG. 2.

EXAMPLE 6

The quasi-living nature of the nickel catalyst, for co-polymerization of ethylene with 5-norbornen-2-yl acetate was then tested.

Molecular Weight Information

Time dependence studies of ethylene co-polymerization with 5-norbornen-2-yl acetate were carried out. Specifically, a toluene solution containing L($^i$Pr$_2$)Ni(CH$_2$Ph)(PMe$_3$) (about 0.68 mM), Ni(COD)$_2$ (about 1.70 mM) and 5-norbornen-2-yl acetate (about 0.15 M) was pressurized with about 100 psi of ethylene and stirred at about 20° C. The reactor was depressurized after varied amounts of time, as seen in Table 3, and the reaction mixture was quenched immediately with acetone. The functionalized co-polymers were then isolated by filtration and were dried in vacuum.

Figure 3:
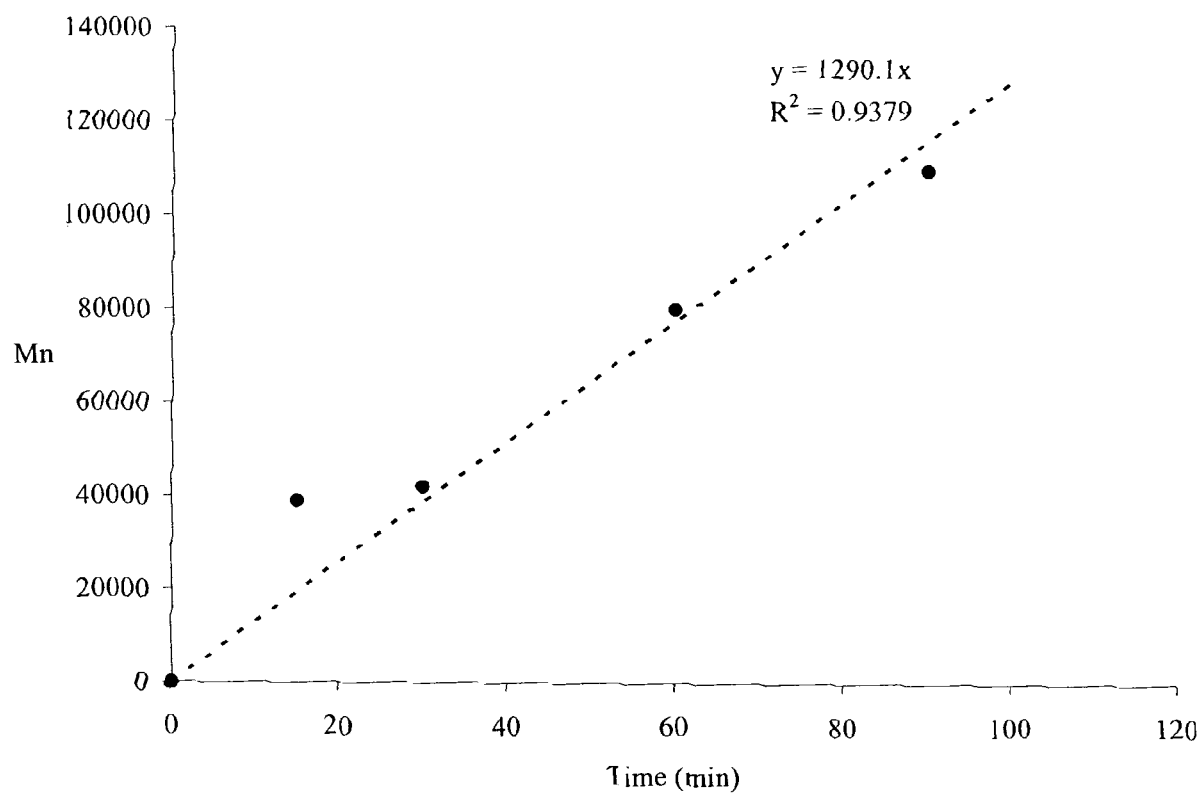
FIG. 3 is a graphical representation of an embodiment of the present invention showing $M_n$ versus time for the co-polymerization of ethylene with 5-norbornen-2-yl acetate described in Examples 7, 8, 9 and 10 and shown in Table 3.

In case of the ethylene/5-norbornen-2-yl acetate co-polymerization a linear increase of the number average molecular weight (Mn) with time was observed as shown in Table 3 and FIG. 3. Such a liner relationship is characteristics of a living polymerization.

TABLE 3

| Time (min) | $M_w$ | $M_n$ | $M_w/M_n$ |
|---|---|---|---|
| 15 | $4.68 \times 10^4$ | $3.90 \times 10^4$ | 1.2 |
| 30 | $6.71 \times 10^4$ | $4.20 \times 10^4$ | 1.6 |
| 60 | $1.08 \times 10^5$ | $8.00 \times 10^4$ | 1.4 |
| 90 | $1.56 \times 10^5$ | $1.10 \times 10^5$ | 1.4 |

Table 3 shows the weight average molecular weight ($M_w$) and number average molecular weight ($M_n$) as a function of time for ethylene co-polymerization with 5-norbornen-2-yl acetate. [L($^i$Pr$_2$)Ni(CH$_2$Ph)(PMe$_3$) (about 0.68 mM); Ni(COD)$_2$ (about 1.70 mM); 5-norbornen-2-yl acetate (about 0.15 M); about 100 psi ethylene pressure and about 20° C. temperature].

Consistent with being a quasi-living polymerizing system, narrow molecular weight distributions in the range of about 1.2-1.6 were observed in all cases (Table 3). The data in FIG. 3 and Table 3 are consistent with the quasi-living co-polymerization of ethylene with 5-norbornen-2-yl acetate initiated by a nickel catalyst formed by a combination of two neutral complexes, L($^i$Pr$_2$)Ni(CH$_2$Ph)(PMe$_3$) and Ni(COD)$_2$.

EXAMPLE 7

A glass reactor was loaded inside a glove box with L($^i$Pr$_2$)Ni(CH$_2$Ph)(PMe$_3$) (about 20 µmol 2.00 g of 8.77 mM solution in toluene), Ni(COD)$_2$ (about 50 µmol; 2.50 g of 17.6 mM solution in toluene), 5-norbornen-2-yl acetate (about 4.50 mmol; 3.00 g of 1.30 M solution in toluene) and toluene (about 18.45 g), such that the total volume of the toluene solution was about 30 mL. The glass reactor was sealed inside the glove box and was attached to a vacuum/nitrogen line manifold. Ethylene was fed continuously into the reactor at about 100 psi and the pressurized reaction mixture was stirred at about 20° C. Ethylene was vented after about 15 minutes and acetone was added to quench the polymerization. The precipitated polymer was collected by filtration and dried under high vacuum overnight. About 0.160 g of ethylene/5-norbornen-2-yl acetate co-polymer was obtained. The activity of the catalyst with respect to ethylene consumption was about 96 kg mol$^{-1}$ h$^{-1}$.

Polymer Characterization: GPC Analysis (o-dichlorobenzene, 135° C.): MW=about $4.68 \times 10^4$, $M_w/M_n$=about 1.2. DSC Analysis: $T_m$=broad glass transition. $^1$H NMR (C$_6$D$_6$/1,2,4-trichlorobenzene, about 115° C.): 22.8 methyl branches per 1000 methylene carbons. 7.3% incorporation of norbornenyl group.

EXAMPLE 8

A glass reactor was loaded inside a glove box with L($^i$Pr$_2$)Ni(CH$_2$Ph)(PMe$_3$) (about 20 µmol; 2.00 g of 8.77 mM solution in toluene), Ni(COD)$_2$ (about 50 µmol; 2.50 g of 17.6 mM solution in toluene), 5-norbornen-2-yl acetate (about 4.50 mmol; 3.00 g of 1.30 M solution in toluene) and toluene (about 18.45 g) such that the total volume of the toluene solution was about 30 mL. The glass reactor was sealed inside the glove box and was attached to a vacuum/nitrogen line manifold. Ethylene was fed continuously into the reactor at about 100 psi and the pressurized reaction mixture was stirred at about 20° C. Ethylene was vented after about 30 minutes and acetone was added to quench the polymerization. The precipitated polymer was collected by filtration and dried under high vacuum overnight. About 0.526 g of ethylene/5-norbornen-2-yl acetate co-polymer was obtained. The activity of the catalyst with respect to ethylene consumption was about 63 kg mol$^{-1}$ h$^{-1}$.

Polymer Characterization: GPC Analysis (o-dichlorobenzene, about 135° C.): $M_w$=about $6.71 \times 10^4$, $M_w/M_n$=about 1.6. DSC Analysis: $T_m$=about 88° C. (broad). $^1$H NMR (C$_6$D$_6$/1,2,4-trichlorobenzene, about 115° C.): 30.7 methyl branches per 1000 methylene carbons. 14.5% incorporation of norbornenyl group.

EXAMPLE 9

A glass reactor was loaded inside a glove box with L($^i$Pr$_2$)Ni(CH$_2$Ph)(PMe$_3$) (about 20 µmol; 2.00 g of 8.77 mM solution in toluene), Ni(COD)$_2$ (about 50 µmol; 2.50 g of 17.6 mM solution in toluene), 5-norbornen-2-yl acetate (about 4.50 mmol; 3.00 g of 1.30 M solution in toluene) and toluene (about 18.45 g) such that the total volume of the toluene solution was about 30 mL. The glass reactor was sealed inside the glove box and was attached to a vacuum/nitrogen line manifold. Ethylene was fed continuously into the reactor at about 100 psi and the pressurized reaction mixture was stirred at about 20° C. Ethylene was vented after about 60 minutes and acetone was added to quench the polymerization. The precipitated polymer was collected by filtration and dried under high vacuum overnight. About 0.843 g of ethylene/5-norbornen-2-yl acetate co-polymer was obtained. The activity of the catalyst with respect to ethylene consumption was about 45 kg mol$^{-1}$ h$^{-1}$.

Polymer Characterization: GPC Analysis (o-dichlorobenzene, about 135° C.): $M_w$=about $1.08 \times 10^5$, $M_w/M_n$=about 1.4. DSC Analysis: $T_m$=broad glass transition. $^1$H NMR (C$_6$D$_6$/1,2,4-trichlorobenzene, about 115° C.): 30.8 methyl branches per 1000 methylene carbons. 10.4% incorporation of norbornenyl group.

EXAMPLE 10

A glass reactor was loaded inside a glove box with L($^i$Pr$_2$)Ni(CH$_2$Ph)(PMe$_3$) (about 20 µmol; 2.00 g of 8.77 mM solution in toluene), Ni(COD)$_2$ (about 50 µmol; 2.50 g of 17.6 mM solution in toluene), 5-norbornen-2-yl acetate (about 4.50 mmol; 3.00 g of 1.30 M solution in toluene) and toluene (about 18.45 g) such that the total volume of the toluene solution was about 30 mL. The glass reactor was sealed inside the glove box and was attached to a vacuum/nitrogen line manifold. Ethylene was fed continuously into the reactor at about 100 psi and the pressurized reaction mixture was stirred at about 20° C. Ethylene was vented after about 90 minutes and acetone was added to quench the polymerization. The precipitated polymer was collected by filtration and dried under high vacuum overnight. About 1.031 g of ethylene/5norbornen-2-yl acetate co-polymer was obtained. The activity of the catalyst with respect to ethylene consumption was about 36 kg mol$^{-1}$ h$^{-1}$.

Polymer Characterization: GPC Analysis (o-dichlorobenzene, about 135° C.): $M_w$=about $1.56 \times 10^5$, $M_w/M_n$=about 1.4. DSC Analysis: $T_m$=broad glass transition. $^1$H NMR ($C_6D_6$/1,2,4-trichlorobenzene, about 115° C.): 9.47 methyl branches per 1000 methylene carbons. 7.20% incorporation of norbornenyl group.

REFERENCES

The following references are hereby incorporated by reference: 1. Ittel, S. D.; Johnson, L. K.; Brookhart, M. *Chem. Rev.* 2000, 100, 1169 (and references therein); 2. Younkin, T.; Connor, E. F.; Henderson, J. L; Friedrich, S. K.; Grubbs, R. H.; Bansleben, D. A. *Science,* 2000, 287, 460; WO 9842664.; WO 9842665; 3. Coates, G. W.; Hustad, P. D.; Reinartz, S. *Angew. Chem. Int. Ed.* 2002, 41, 2236 (and references therein); 4. Jansen, J. C.; Mendichi, R.; Locatelli, P.; Tritto, I. *Macromol. Rapid Commun.* 2001, 22, 1394; 5. Lee, B. Y.; Bazan, G. C.; Vela, J.; Komon, Z. J. A.; Bu, X. *J. Am. Chem. Soc.* 2001, 123, 5352; and 6. Schunn, R. A.; Ittel, S. D.; Cushing, M. A. *Inorg. Synth.* 1990, 28, 94.

These and other changes and modifications are intended to be included within the scope of the invention. While for the sake of clarity and ease of description, several specific embodiments of the invention have been described; the scope of the invention is intended to be measured by the claims as set forth below. The description is not intended to be exhaustive or to limit the invention to the form disclosed. Other variations of the invention will be apparent in light of the disclosure and practice of the invention to one of ordinary skill in the art to which the invention applies.

The invention claimed is:

1. A copolymer comprising a portion formed by copolymerization of a first and second olefin, wherein the first olefin is selected from the group consisting of the general formula $R^4CH\!=\!CH_2$, cyclopentene, and norbornene, and the second olefin is a polar olefin of the general formula $H_2C\!=\!CR^5(CH_2)_sCO_2R^6$, wherein $R^4$ is hydrogen or hydrocarbyl, $R^5$ is hydrogen or substituted hydrocarbyl bearing a functional group, and $R^6$ is a substituted hydrocarbyl bearing a functional group, and s is an integer from 0 to 100, wherein said copolymer is characterized by a narrow molecular weight distribution of about 1.2-1.6, and wherein the copolymer is a block co-polymer, a star-shaped polymer, a graft polymer or an alternating polymer.

2. The copolymer of claim 1, wherein said copolymer has hydrophilic properties.

3. The copolymer of claim 1, wherein $R^4$ is hydrogen.

4. The copolymer of claim 1, wherein $R^5$ is substituted hydrocarbyl bearing a functional group.

5. The copolymer of claim 1, wherein $R^4$ is hydrogen and $R^5$ is substituted hydrocarbyl bearing a functional group.

* * * * *